INVENTORS
Bommaya B. Sundaresan
Charles I. Harding
by Hoopes, Leonard & Buell
their Attorneys

3,389,961
METHODS OF RECOVERING GASES AND VAPORS

Bommaya B. Sundaresan and Charles I. Harding, Gainesville, Fla., assignors to Nitram Chemicals, Inc., a corporation of Florida; Wilson-Toomer Division of the Emhart Corporation, a corporation of Connecticut; and the University of Florida
Filed Jan. 14, 1966, Ser. No. 520,570
8 Claims. (Cl. 23—162)

ABSTRACT OF THE DISCLOSURE

A method of recovering oxides of nitrogen by adsorbing on a bed of synthetic zeolite and thereafter desorbing by passing a gas at elevated temperature through said bed.

---

Figure 2:
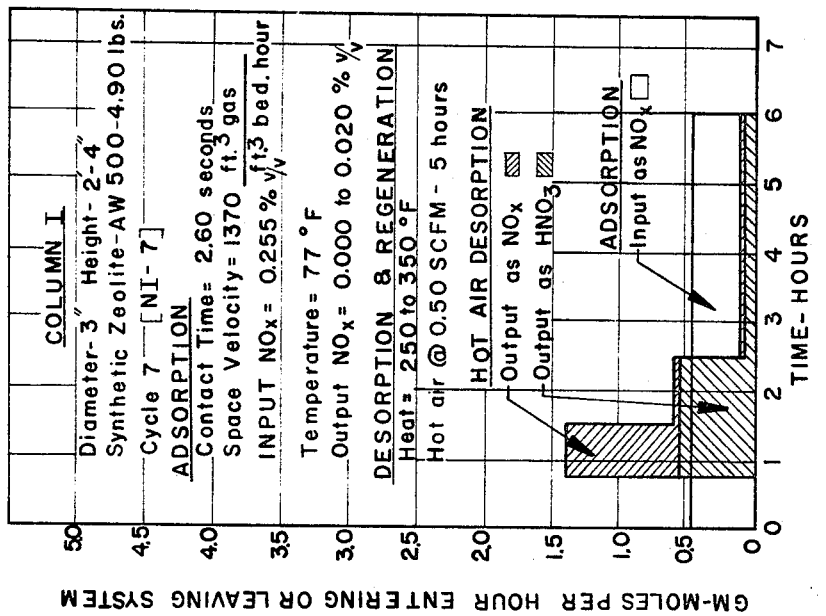

This invention relates to methods of recovering gases and vapors and particularly to novel means and methods for economically recovering valuable gases and vapors, particularly gaseous oxides by adsorption and desorption to produce valuable commodities. The method of our invention, in addition to providing a practical method of producing and recovering salable materials, provides the incidental benefit of reducing the emission of gaseous oxides into the atmosphere which might otherwise cause some air contamination.

The method of our invention is of value in recovering gaseous vapors generally, such as for example, oxides of nitrogen and sulfur. The invention will be particularly described in connection with the recovery of oxides of nitrogen, however, it is to be understood that the method and means for recovering such gaseous vapors is not to be so limited, because other gases and vapors are similarly susceptible of recovery.

Nitric acid manufacture commonly employs catalytic oxidation of ammonia to form nitric oxide (NO) according to the following equation:

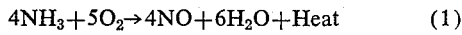

$$4NH_3 + 5O_2 \rightarrow 4NO + 6H_2O + Heat \qquad (1)$$

This reaction is favored at a high temperature, and is followed by conversion of nitric oxide to nitrogen dioxide, at a lower temperature:

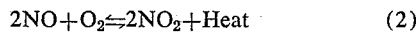

$$2NO + O_2 \rightleftharpoons 2NO_2 + Heat \qquad (2)$$

The resultant nitrogen dioxide forms nitric acid by reaction with water:

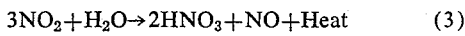

$$3NO_2 + H_2O \rightarrow 2HNO_3 + NO + Heat \qquad (3)$$

This leads to the release of NO in the waste gas from the process ("tail gas"). The tail gas ordinarily will contain several percent of oxygen also; the balance is nitrogen, some water vapor and rare gases from the air.

Oxides of nitrogen in the tail gas are essentially in the form of NO as they enter the stack, but conditions are favorable for their conversion to $NO_2$ as they are being discharged into the atmosphere. NO, $NO_2$, and $N_2O_4$ equilibria represented below indicate that this conversion would take place under normal atmospheric conditions.

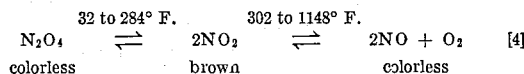

| 32 to 284° F. | | 302 to 1148° F. | | |
|---|---|---|---|---|
| $N_2O_4$ | $\rightleftharpoons$ | $2NO_2$ | $\rightleftharpoons$ | $2NO + O_2$ [4] |
| colorless | | brown | | colorless |

Nitric acid manufacturers have been trying, with limited success, to find an economical method to make use of the released NO to improve plant efficiency. Nitrogen oxides concentrations of about 0.4 percent or less by volume make it uneconomical for further conversion to nitric acid in the absorption tower.

It will be seen from the foregoing that a method of recovering these nitrogen oxide tailings would be of economic value in improved plant efficiency by reducing nitrogen oxides emission. It is accordingly an object of the present invention to provide a method for recovery of gases and vapors to improve recovery in various manufacturing processes.

It is a further object to provide a method of recovering oxides of nitrogen as nitric acid. It is another object of this invention to treat a mixture of nitrogen oxides and sulfur dioxide from lead chamber sulfuric acid plants, to recover the waste vapors from such plants. In connection with this invention it should be noted that the use of silica gel for sulfur dioxide adsorption has been widely reported and it has also been tried to further concentrate nitric oxide in the gaseous mixture resulting from direct atmospheric oxidation by the Wisconsin process using silica gel. However, adsorption of nitrogen oxides at low inlet concentrations below 0.4 percent by volume, using silica gel or other commercial adsorbents, has not been attempted to our knowledge.

Typical performance of a well-operated nitric acid plant might yield oxides of nitrogen of about 0.2 percent by volume in the tail gas. Under such conditions the equivalent nitric acid content of the unrecovered oxides of nitrogen is valued at about $1.00 to $1.50 per ton of nitric acid produced. Complete recovery of the nitrogen oxides should be the ultimate aim. This would result in considerable improvement in plant operation economy.

Prior to the present invention three methods of reducing the concentration of oxides of nitrogen in waste gases have been attempted. These methods are:

(1) Absorption in water solution,
(2) Reaction with an alkaline material,
(3) Catalytic oxidation by combustion.

Of the three methods, the catalytic oxidation by combustion method has been the only method commercially used in the United States to any extent. However, even with this method oxides of nitrogen are lost and the high maintenance cost and loss of time for maintenance have proven to be so costly that in many instances recovery attempts have been essentially abandoned.

We have discovered that oxides of nitrogen can be adsorbed and desorbed at relatively low cost and high efficiency by following certain techniques and using certain materials for adsorption.

We have found, for example, that the oxides of nitrogen when accompanied by at least their stoichiometric equivalent of oxygen can be effectively adsorbed in finely divided synthetic zeolites, either in the presence or absence of water vapor. In the absence of water vapor of the evidence indicates the adsorbed molecule is nitrogen dioxide ($NO_2 \rightleftharpoons N_2O_4$). In the presence of water vapor the adsorbed molecules are nitrogen dioxide ($NO_2 \rightleftharpoons N_2O_4$) and nitric acid ($HNO_3$). In either case substantially complete recovery can be made by desorption with steam, NO-rich gases, air, or combinations of these three at appropriate elevated temperatures. The synthetic zeolite exhibits some characteristics of a catalyst, at least to the extent that it effectively accelerates the completion of Reactions 2 and 3. It also effectively removes the products of Reactions 2 and 3 and shifts the respective equilibria in the desired direction, a function that is not necessarily catalytic in the classical sense.

By synthetic zeolites we mean tetrahedral crystals of oxygen and certain cations such as aluminum, silicon sodium, potassium and calcium from which the water of hydration has been carefully removed to form a honeycomb or porous sponge like crystal lattice. In our process we selected those synthetic zeolites having a free pore size substantially equal to or larger than the smallest effective diameter of the molecules which we desire to adsorb. Such a synthetic zeolite might be, for example, a tetrahedral crystal of aluminum and silicon oxides with calcium oxides.

The practice of our invention can perhaps best be understood by a consideration of certain practical examples of the recovery of oxides of nitrogen. The tail gas from a typical catalytic nitric oxide plant was collected from the stack and passed through an adsorption desorption system. Silica gel and various synthetic zeolites were used in this system.

nitrogen oxide issues from the adsorber 5A under suction from blower 8. Blower 8 discharges under slight positive pressure into stack 1, above butterfly valve 9 which serves to separate the suction and pressure sides of the tail gas flow. Adsorber 5A removes, in addition to the nitrogen oxides, approximately 60–80 percent of the water vapor entering with the tail gas. Assuming use of synthetic zeolite, the adsorbent in service in adsorber 5A will contain, after it is saturated, about 3 to 7 pounds

TABLE 1.—PERFORMANCE OF SILICA GEL AND SYNTHETIC ZEOLITE SYSTEMS

| System | Volume of Gas Treated, ft.$^3$ | Cumulative Volume of Gas, ft.$^3$ | Gas Concentration in volume percent | | | | Loading, lb. of Oxides per 100 lb. of Adsorbent | |
|---|---|---|---|---|---|---|---|---|
| | | | NO$_x$ | | SO$_2$ | | NO$_x$ | SO$_2$ |
| | | | In | Out | In | Out | | |
| Synthetic Zeolite (4.90 lb.) | ----- | 0.00 | 0.247 | 0.000 | ----- | ----- | ----- | ----- |
| | 780.00 | 780.00 | 0.224 | 0.000 | ----- | ----- | 4.47 | ----- |
| | 140.00 | 920.00 | 0.221 | 0.020 | ----- | ----- | 5.00 | ----- |
| | 70.50 | 990.00 | 0.218 | 0.054 | ----- | ----- | 5.50 | ----- |
| | 190.00 | 1,180.00 | 0.214 | 0.214 | ----- | ----- | 5.86 | ----- |
| Synthetic Zeolite (0.69 lb.) | ----- | 0.00 | 0.246 | 0.000 | 0.121 | 0.000 | ----- | ----- |
| | 40.00 | 40.00 | 0.282 | 0.024 | 0.121 | 0.000 | 1.74 | 1.15 |
| | 80.00 | 120.00 | 0.354 | 0.104 | 0.121 | 0.020 | 5.23 | 3.26 |
| | 136.00 | 256.00 | 0.354 | 0.354 | 0.120 | 0.076 | 8.16 | 3.87 |
| Synthetic Zeolite (0.69 lb.) | | | | | 0.182 | 0.000 | | |
| | 14.00 | 14.00 | ----- | ----- | 0.248 | 0.000 | ----- | 0.74 |
| | 16.00 | 30.00 | ----- | ----- | 0.320 | 0.020 | ----- | 1.80 |
| | 111.00 | 141.00 | ----- | ----- | 0.350 | 0.350 | ----- | 5.77 |
| Silica Gel (5.35 lb.) | ----- | 0.00 | 0.237 | 0.010 | ----- | ----- | ----- | ----- |
| | 23.00 | 23.00 | 0.252 | 0.020 | ----- | ----- | 0.12 | ----- |
| | 29.00 | 52.00 | 0.250 | 0.052 | ----- | ----- | 0.26 | ----- |
| | 30.00 | 82.00 | 0.246 | 0.060 | ----- | ----- | 0.38 | ----- |

As will be seen from Table 1, silica gel reached a loading of only 0.12 before the exit nitrogen oxides concentration reached 0.02 volume percent. The corresponding loading for synthetic zeolite is 5.00. For the industrial applications envisioned, it will be apparent that the synthetic zeolite is by far the most effective, although both may be economically feasible for technical purposes.

Figure 1:
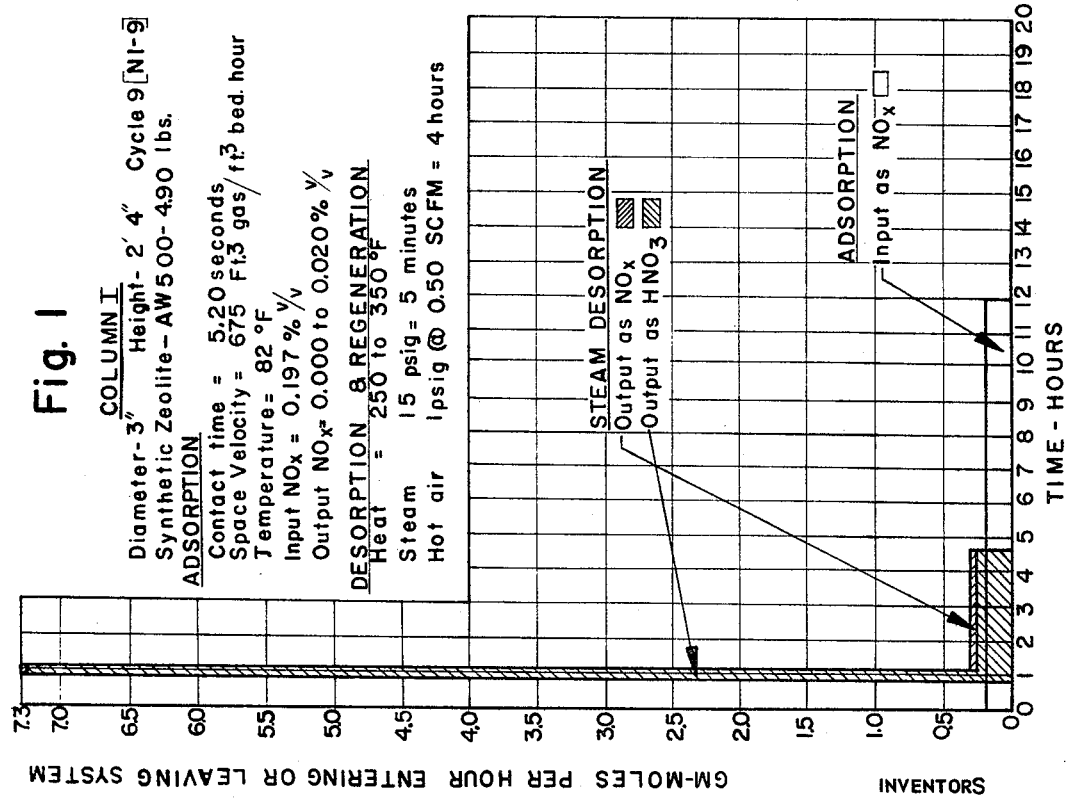

Typical desorption results are shown in the histograms which appear as FIGURES 1 and 2 of this application. It will be seen from FIGURE 1 that upon desorption by steam, super-heated so that the steam was neither condensed upon nor adsorbed by the synthetic zeolite, the effluent vapor after condensation yielded 72.5 percent of the nitrogen oxides in the form of nitric acid, and 27.5 perecnt uncondensed and diluted with steam and other gases. The latter stream is recovered either by recycling to the adsorbent or by direct use in some other process step where its high concentration enhances its value.

FIGURE 2 shows the results of desorption with hot, relatively dry, inert gas. The effluent after condensation yielded 58 percent of the nitrogen oxides as nitric acid and 42 percent uncondensed NO$_x$.

The combination of efficient adsorption and simple effective desorption makes possible process schemes for commercial use of our invention.

Figure 3:
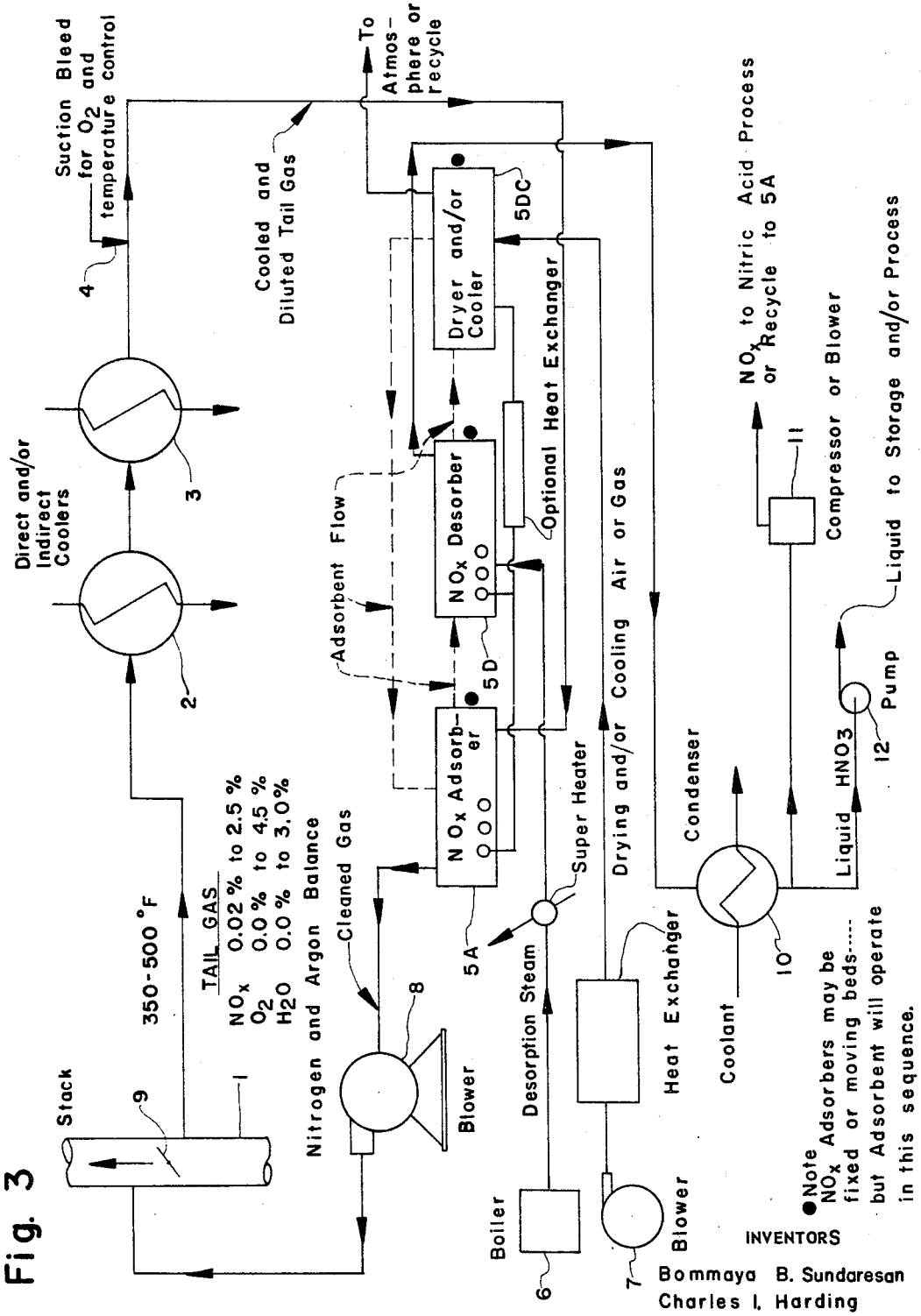

FIGURE 3 illustrates one method for incorporating our basic findings into a commercially feasible process for improving the recovery of nitrogen oxides in a nitric acid plant.

Tail gas issuing from a nitric acid process through stack 1 at elevated temperature, and at the compositions shown, is first cooled to slightly above ambient temperature in coolers 2 and 3. Cooling for this purpose may be in two stages of water cooling, as shown, in one stage of gas-to-gas heat exchange plus one stage of water cooling, or by other suitable arrangements. Atmospheric air in regulated proportion is introduced into the process flow at point 4, for purposes of controlling oxygen concentration and temperature and of stabilizing back-pressure upon the stack. The cooled and diluted tail gas next enters the adsorption step 5A.

For convenience in visualizing the process flow, we chose to show the adsorbent as moving from one zone to another in the adsorption-desorption cycle. It should be understood that actual equipment design might indicate the desirability of having the gas flow change from one zone to another. The process may be operated either continuously or cyclically. Tail gas essentially free of of nitrogen oxides and 17 to 13 pounds of water vapor per 100 pounds of dry adsorbent respectively. This adsorbent then is ready for desorbing, drying and/or cooling, and return to the next cycle of adsorption.

In desorber 5D, freshly saturated adsorbent from 5A is exposed to super-heated steam. The function of the steam is two-fold; it supplies heat for the endothermic operation of volatilizing the adsorbed nitrogen oxides, nitric acid and some of the water vapor, and at the same time serves as a carrier to transfer these vapors out of the desorber. Supplemental heat, as from electric coils or inter-stage re-heating of the vapors, may or may not be required as an adjunct to desorption.

The mixture of vapors, principally steam, nitric acid and nitrogen oxide issuing from desorber 5D passes to condenser 10 where cooling water is used to cool the stream and to condense that portion of it which is condensable at the temperature of a given cooling water. The uncondensed portion of the vapor is drawn off by compressor or fan 11. If the vapor is to be recycled to a pressure operation the former is required, while if it is to be recycled to adsorber 5A, a blower may be sufficient. The condensed portion of this stream from desorber 5D is drawn off from condenser 10 as liquid, principally a water solution of nitric acid, by pump 12. Depending upon its concentration, the nitric acid may be used as such, or may be returned to the main process for upgrading. We have found that the synthetic zeolite quantitatively removes oxidized nitrogen in the form of HNO$_3$ and NO$_2$, under the conditions we have specified, but that it removes very little if any nitrogen oxide in the form of NO. This is the reason for our reference above, at point 4, to the introduction of oxygen. Although NO may be the predominant form of nitrogen oxide in the entering gas to our process, from stack 1, if sufficient oxygen is present, we believe that Reaction 2 previously cited is greatly accelerated in the presence of the adsorbent because the latter shifts the equilibrium to the right by removing the product NO$_2$. Reaction 2 is reversible, and favors NO$_2$ at lower temperatures. When NO$_2$ is desorbed at the relatively high temperatures in desorber 5D, equilibrium quantities of NO tend to be created by reversal of Reaction 2.

Upon exposure to the condensate in condenser 10, some of the NO$_2$ still existing at that time will react with water according to Reaction 3 previously cited. Thus the proportion of NO which passes in the vapor phase to point 11 will depend upon at least two equilibrium constants, those for Reactions 2 and 3.

When the water vapor content of tail gas from stack 1 is high, it is possible (as we have found experimentally) to desorb nitric acid and nitrogen oxides in desorber 5D by super-heated steam without completely desorbing water vapor. Under this condition, it may be preferable to continue the desorption by air, so as to minimize the amount of water to be condensed in condenser 10. Air for this purpose is supplied by fan 7, and this air may be heated separately, or auxiliary heating means may be provided in vessel 5DC. Effluent air from drying the adsorbent is discharged to the atmosphere or to recycle.

Alternatively, depending upon the conditions of a given plant design, the function of vessel 5DC may be to cool the adsorbent after it has been regenerated, the purpose being to increase the efficiency and capacity of adsorber 5A. Air for cooling is furnished by fan 7 without heating.

Similarly a recycled heated stream of NO or NO-rich gas may be used for desorption. Desorption by NO has the advantage that it eliminates the heat input required to provide the latent heat of steam, in steam desorption systems, and the possibility of dilution by steam and has the further unrelated advantage that it will repress the undesirable decomposition reaction, $$2NO_2 \rightleftharpoons 2NO + O_2$$

which is favored by temperatures as high as those normally required for stripping. NO is known to be stable at temperatures well above those needed for desorption. To the extent that additional $NO_x$ is introduced to the NO-rich desorbing gas upon condensation, this is taken care of simply by bleeding off and recycling the volume gained at condensation.

A practical advantage of NO for use in commercially available adsorption equipment for atmospheric pressure operation is that the customary short-circuiting of some rich gas into the desorption stream also would present no dilution problem, such as would be faced with other desorbing gases.

In the foregoing specification we have illustrated and described certain preferred practices and embodiments of our invention, it will be understood, however, that this invention may be otherwise embodied within the scope of the following claims.

We claim:
1. The method of recovering oxides of nitrogen rich in NO comprising the steps of adsorbing said oxides of nitrogen in the presence of oxygen on a bed of synthetic zeolite so that at least a part of said oxides are converted to nitric acid and thereafter desorbing said oxides and nitric acid by passing a gas at elevated temperature through said bed.

2. The method of recovering oxides of nitrogen as claimed in claim 1 wherein the desorbing gas is steam at elevated temperature.

3. The method of recovering oxides of nitrogen as claimed in claim 1 wherein the desorbing gas is steam passed through said bed at a super heat temperature such that condensation and adsoprtion of the steam are avoided.

4. The method of recovering oxides of nitrogen as claimed in claim 1 wherein the desorbing gas is air at elevated temperature.

5. The method of recovering oxides of nitrogen as claimed in claim 1 wherein the desorbing gas is rich in NO.

6. The method of recovering oxides of nitrogen as claimed in claim 1 wherein the desorbing gas is steam rich in NO.

7. The method of recovering oxides of nitrogen as claimed in claim 1 wherein the desorbing gas is NO.

8. The method of recovering oxides of nitrogen comprising the steps of supplying a controlled amount of oxygen to said oxides of nitrogen, adsorbing said oxides of nitrogen on a bed of synthetic zeolite in the presence of said oxygen so that at least a part of said oxides are converted to nitric acid and thereafter desorbing the adsorbed oxides of nitrogen and said nitric acid by passing a gas at elevated temperature through said bed.

References Cited

UNITED STATES PATENTS

| | | | |
|---|---|---|---|
| 2,568,396 | 9/1951 | James | 55—68 X |
| 2,578,674 | 12/1951 | Daniels et al. | 55—68 X |
| 2,647,822 | 8/1953 | Pike | 55—68 X |
| 2,866,835 | 12/1958 | Kimberlin et al. | 55—75 X |
| 3,015,369 | 1/1962 | Brennan | 55—68 |

OTHER REFERENCES

Barrer, R. M.: Molecular-Sieve Action of Solids, in Quarterly Reviews, 1949, Chemical Society London, p. 302–304 relied on.

REUBEN FRIEDMAN, *Primary Examiner.*

C. N. HART, *Assistant Examiner.*